US008473318B2

(12) United States Patent
Nielson et al.

(10) Patent No.: US 8,473,318 B2
(45) Date of Patent: Jun. 25, 2013

(54) RISK SCORE DETERMINATION

(75) Inventors: Brett A. Nielson, Spangle, WA (US); Rangarajan Umamaheswaran, Simi Valley, CA (US)

(73) Assignee: Bank of America Corporation, Charlotte, NC (US)

( * ) Notice: Subject to any disclaimer, the term of this patent is extended or adjusted under 35 U.S.C. 154(b) by 24 days.

(21) Appl. No.: 13/186,125

(22) Filed: Jul. 19, 2011

(65) Prior Publication Data
US 2013/0024238 A1 Jan. 24, 2013

(51) Int. Cl.
*G06Q 40/00* (2012.01)
(52) U.S. Cl.
USPC ........................................ 705/7.11; 705/7.42
(58) Field of Classification Search
USPC .................................. 705/7.11–7.42
See application file for complete search history.

(56) References Cited

U.S. PATENT DOCUMENTS

| 7,805,362 B1 * | 9/2010 | Merrell et al. ................... 705/38 |
| 7,904,361 B2 * | 3/2011 | Lawrence ........................ 705/35 |
| 7,904,365 B2 * | 3/2011 | Krowas et al. .............. 705/36 R |
| 8,095,441 B2 * | 1/2012 | Wu et al. ......................... 705/35 |
| 8,140,415 B2 * | 3/2012 | Lawrence et al. ............... 705/35 |
| 8,209,246 B2 * | 6/2012 | Lawrence ........................ 705/35 |
| 2002/0046053 A1 * | 4/2002 | Hare et al. ........................ 705/1 |
| 2005/0267827 A1 * | 12/2005 | Grant et al. ..................... 705/35 |
| 2007/0100744 A1 * | 5/2007 | Wu et al. ......................... 705/38 |
| 2009/0006230 A1 * | 1/2009 | Lyda et al. ...................... 705/35 |

\* cited by examiner

*Primary Examiner* — Thomas Dixon
*Assistant Examiner* — Benjamin S Fields
(74) *Attorney, Agent, or Firm* — Michael A. Springs; Moore & Van Allen PLLC; Sreenivas Vedantam

(57) ABSTRACT

Embodiments of the invention are directed to systems, methods and computer program products for determining a risk score for an agent associated with an entity. In some embodiments, a method includes: (a) receiving first information associated with an agent's action related to an account and/or an agent's actions over a predetermined period of time related to one or more applications, and (b) determining a first risk score based at least partially on the first information. In some embodiments, the method further includes: (c) receiving, from a data system, second information associated with the agent, where the second information comprises one or more entitlements granted to the agent by the entity, and (d) determining a second risk score based at least partially on both the first information and the second information. Embodiments of the invention allow an entity to monitor an agent's actions and determine whether the agent's actions, either singly or cumulatively, pose a risk to the customer's account and/or other information provided by the customer.

60 Claims, 5 Drawing Sheets

RISK SCORE DETERMINATION

BACKGROUND

An entity (e.g., a financial institution) may manage an account (e.g., a financial transaction account) associated with a customer. An agent may, on behalf of the entity, perform one or more actions associated with a customer's information. For instance, the agent may view personal information associated with the customer's account. As a further instance, the agent may execute a monetary transaction associated with the customer's account. There is a need for a system to monitor the agent's actions in order to be able to determine whether any single action (and/or a combination of actions) associated with an agent poses a risk to the entity and/or to the customer's information. In addition to determining whether an agent's actions, either singly or cumulatively, pose a risk to the entity and/or to the customer's information, there is a need to quantify the risk associated with a single action and/or a set of actions executed over a period of time.

BRIEF SUMMARY

Embodiments of the invention are directed to systems, methods and computer program products for determining a risk score for an agent associated with an entity. As used herein, an agent may be associated (e.g., employed) with an entity. The agent may interact with (or provide a service to) a customer or a potential customer, or may interact with an account associated with a customer. In some embodiments, a method includes: (a) receiving first information associated with an agent's action related to an account and/or agent's actions over a predetermined period of time related to one or more applications, and (b) determining a first risk score based at least partially on the first information. In some embodiments, the method further includes: (c) receiving, from a data system, second information associated with the agent, where the second information includes one or more entitlements granted to the agent by the entity, and (d) determining a second risk score based at least partially on both the first information and the second information. Embodiments of the invention allow an entity to monitor an agent's actions and determine whether the agent's actions, either singly or cumulatively, pose a risk to the customer's account and/or other information provided by the customer.

BRIEF DESCRIPTION OF THE DRAWINGS

Figure 1:
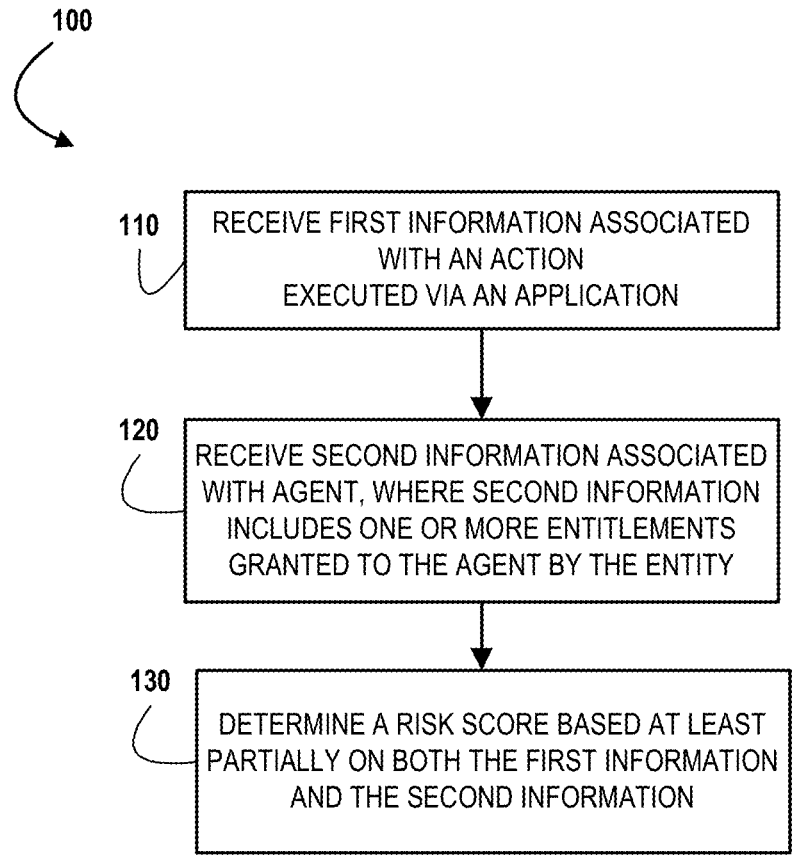
Figure 2:
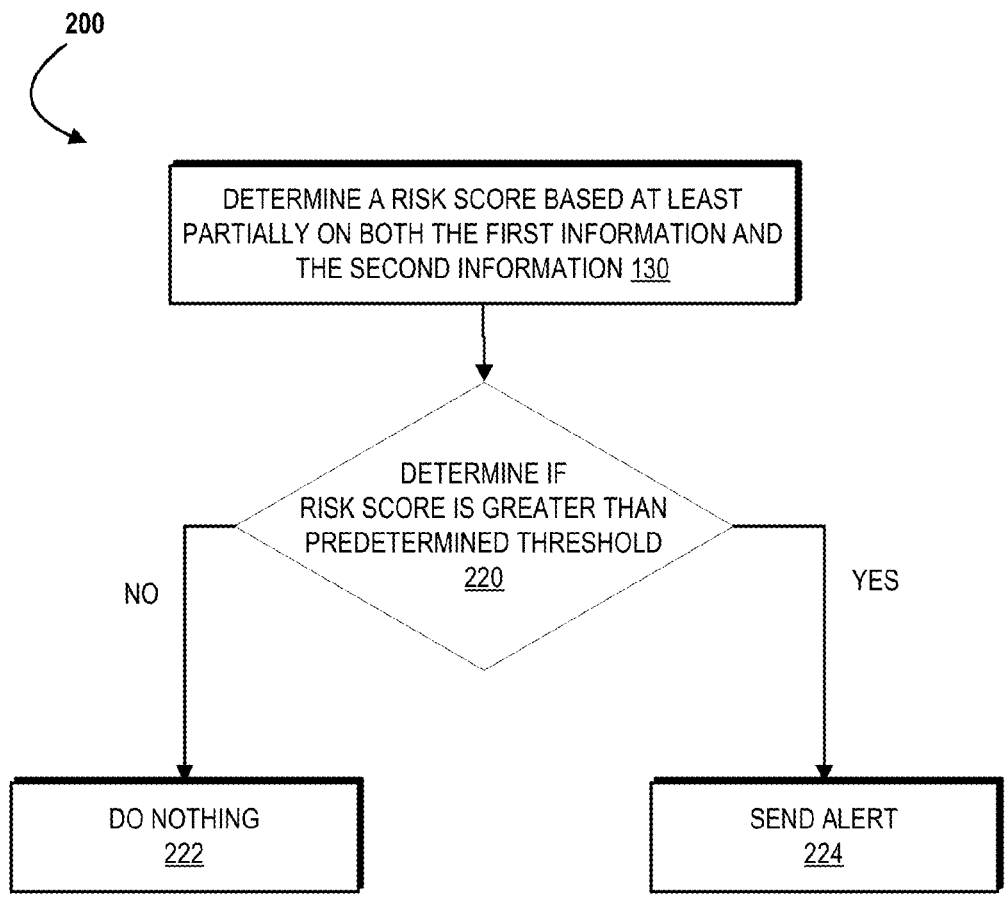
Figure 3:
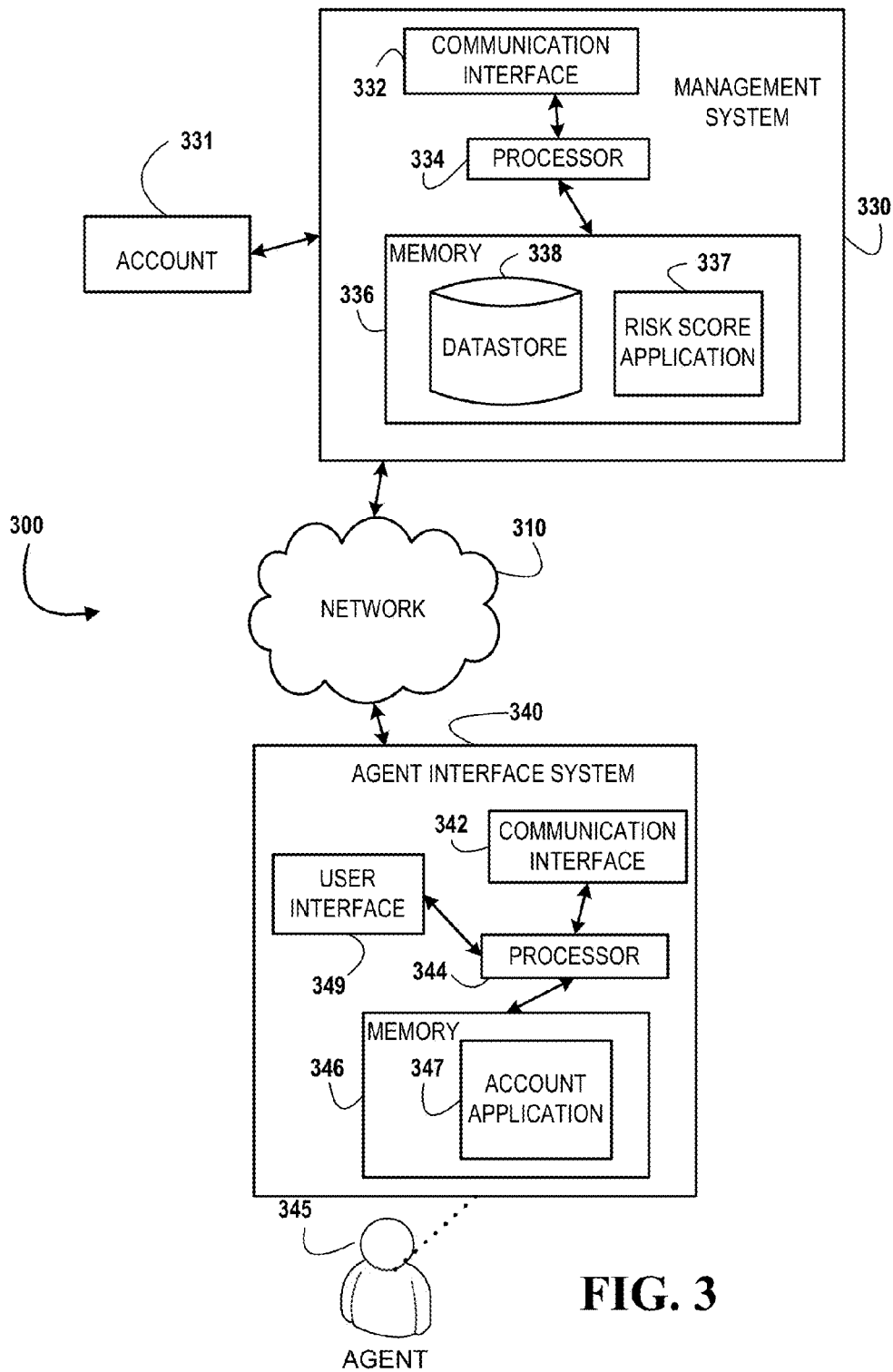
Figure 4:
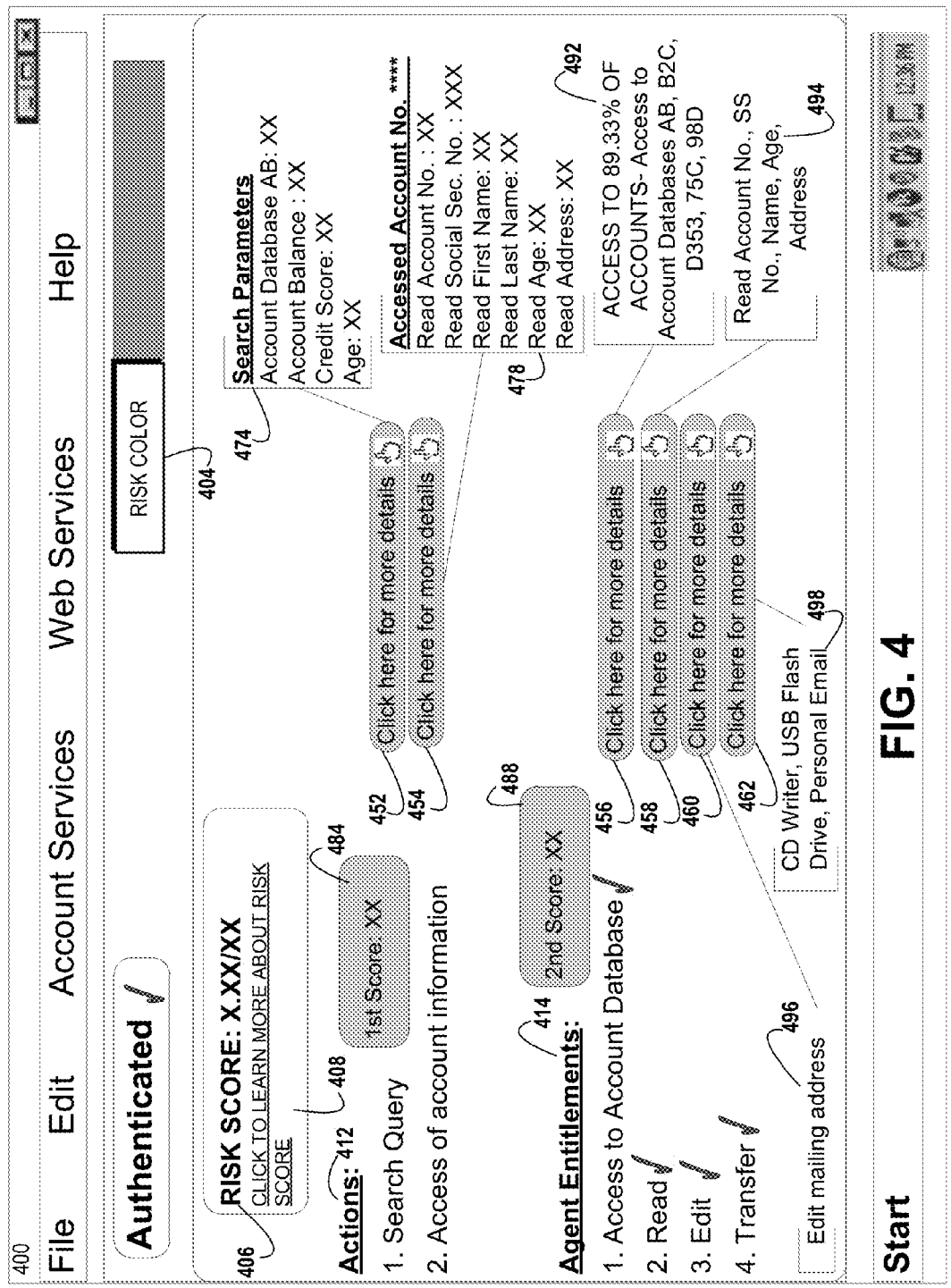
Figure 5:
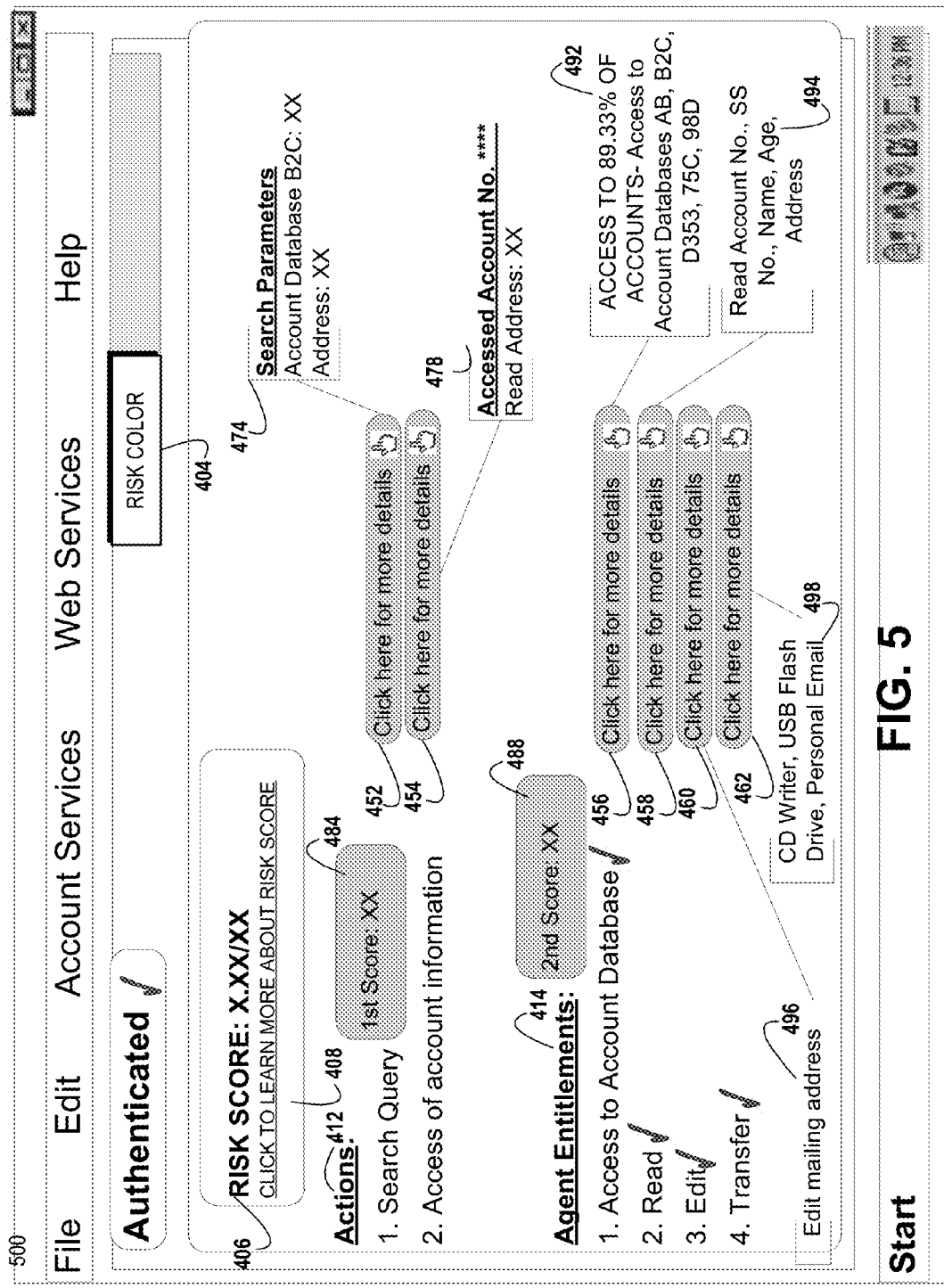

Having thus described embodiments of the invention in general terms, reference will now be made to the accompanying drawings, where:

FIG. 1 is a flowchart illustrating a general process flow for determining a risk score, in accordance with embodiments of the present invention;

FIG. 2 is another flowchart illustrating a general process flow determining a risk score, in accordance with embodiments of the present invention;

FIG. 3 is a block diagram illustrating technical components of a system for determining a risk score, in accordance with embodiments of the present invention; and FIGS. 4-5 are illustrations of a graphical user interface initiated by a system that determines a risk score, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for determining a risk score for an agent associated with an entity and/or a risk score associated with each application-related action executed by the agent. Embodiments of the invention allow an entity to monitor an agent's actions as they pertain to the accessing applications and determine whether the agent's actions, either singly or cumulatively, pose a risk to the customer's account and/or other information provided by the customer. Embodiments of the invention not only allow an entity to determine whether any of the agent's actions poses a risk to the customer's account based on both the agent's action, but also allow an entity to determine whether any of agent's actions poses a risk to the customer's account based on one or more entitlements granted to the agent by the entity. Embodiments of the invention also allow an entity to monitor's an agent's actions over a period of time to determine risky patterns or trends associated with the agent's actions.

Referring now to FIG. 1, a general process flow 100 is provided for determining a risk score, in accordance with embodiments of the present invention. In some embodiments, the process flow 100 is performed by an apparatus (e.g., management system 330 illustrated in FIG. 3, and the like.) having hardware and/or software configured to perform one or more portions of the process flow 100. In such embodiments, as represented at block 110, the apparatus is configured to receive (e.g., from a data system) first information associated with an agent's action related to an account and/or an agent's actions associated with one or more applications over a predetermined period of time. As represented at block 120, the apparatus is configured to receive (e.g., from a data system) second information associated with the agent, where the second information includes one or more entitlements granted to the agent by the entity. As represented at block 130, the apparatus is configured to determine a risk score. As explained below, the risk score may be based 1) only on the first information received at block 110, or 2) only on the second information received at block 120, or 3) on both the first information received at block 110 and the second information received at block 120, and the like.

Therefore, in some embodiments, the apparatus is triggered to generate a risk score based on processing the first information received at block 110. In other embodiments, the apparatus is triggered to generate a risk score based on processing the second information received at block 120. In other embodiments, the apparatus is triggered to generate a risk score based on both receiving the first information at block 110 and receiving the second information at block 120.

In some embodiments, the agent is an employee of an entity. In other embodiments, the agent is not an employee of an entity, but still provides a service under the direction and/or supervision of the entity. Therefore, the agent may be associated with or affiliated with the entity. In some embodiments, the "customer" may be a customer (e.g., an account holder or a person who has an account (e.g., banking account, credit account, and the like.) at the entity) or potential customer (e.g., a person who has submitted an application for an account, a person who is the target of marketing materials that are distributed by the entity, a person who applies for a loan that not yet been funded) who may receive a service provided by the agent. The entity may provide (e.g., sell) goods or services (e.g., banking services) to customers. In some embodiments, the entity may be any general organization (profit or non-profit) that employs (or contracts with) agents to provide goods or services to customers. In some embodiments, the entity may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a customer to establish an account with the entity. An "account" may be the relationship that the customer has with the entity. Examples of accounts include a deposit account, such as a transactional account (e.g., a banking account), a savings account, an investment account, a money market account, a time deposit, a demand deposit, a pre-paid account, a credit account, a non-monetary customer profile that includes only personal information associated with the customer, and the like. The account is associated with and/or maintained by the entity.

Regarding block 110, the agent may be an employee of the entity. In other embodiments, the agent may not be an employee of an entity, but may still provide a service under the direction and/or supervision of the entity. Therefore, the agent may provide a service to the customer and/or to an account associated with the customer. In other embodiments, the agent may interact with the customer or with an account associated with the customer.

The first information may include information regarding an instance of an action performed by the agent. An action, as used herein, is performed or executed by an agent via a software application. The first information associated with the action may be captured in one or more datastores that allow for analytics and/or logic to be performed on the information for the purpose of leveraging the collected information to execute various routines/logic. The action may be a monetary-related or non-monetary-related action. In addition, the action may be an account-related or a non-account related service.

The first information includes information regarding the agent's use of applications to execute one or more actions with respect to a customer's account. For example, an agent may execute a search query via an account search application. As a further example, the agent may access a customer's account and read information (e.g., name, contact information, account number, social security number, account balance, payment terms, transaction history, and the like.) associated with the account. In some embodiments, the agent may edit the account information (e.g., edit a mailing address or other contact information) with or without the permission of either the customer or the entity. In some embodiments, the agent may even transmit the account information to an external system (e.g., the agent's personal email account, the agent's personal portable data storage system) with or without the permission of either the customer or the entity.

In some instances, the agent's action may be prompted by an action or instruction of the customer. For instance, a customer may contact an agent at the entity via email, phone, mail, text, or some other communication mechanism. For instance, a customer may contact (via a communication mechanism) an agent in order to change a mailing address associated with the customer's account. As a further instance, a customer may contact (via a communication mechanism) an agent in order to make a wire transfer of funds out of the customer's account. As a further instance, a customer may contact (via a communication mechanism) an agent to open an account or request an increase of a credit maximum associated with an account. As a further instance, a customer may contact (via a communication mechanism) an agent to request a withdrawal of a fee levied against an account for one or more reasons (e.g., an overdraft situation). For each of these instances, an agent may view account information or other information associated with a customer. For instance, the agent may view the name, account number, account balance, payment card number, social security number, contact information, etc. In some embodiments, the agent may be prompted by the customer to edit one or more information elements (e.g., mailing address, phone number, email address, etc.) associated with the customer's account.

In other instances, the agent's action may be prompted by an action or instruction of the entity. For instance, the entity may prompt an agent to call a customer if a system associated with the entity detects potential unauthorized activity associated with a customer's debit card. As a further instance, the entity may prompt an agent to impose an assessment on a customer if the system associated with an entity detects a deposit account discrepancy situation associated with an account. As a further instance, the entity may prompt an agent to review a paper or electronic application submitted to the entity by a prospective customer, where the application may be for a mortgage, bank account, investment account, and the like.

In still other instances, the agent's action may be unilaterally initiated by the agent. For example, the service may be an instance where the agent unilaterally changes a status associated with the customer, where the customer may or may not qualify for the changed status. The customer may or may not have knowledge that the agent changed the status of the customer. Moreover, the entity may not have authorized the agent to change the status of the customer. As a further example, the service may be an instance where the agent unilaterally waives or imposes a fee for the customer, where the customer may or may not qualify for a fee waiver or the fee imposition. The customer may or may not have knowledge that the agent waived or imposed a fee for the customer. Moreover, the entity may not have authorized the agent to waive or impose a fee for the customer. As a further example, the service may be an instance where the agent unilaterally lowers or increases an interest rate associated with the customer's account, where the account may or may not qualify for the lower or the higher interest rate. The customer may or may not have knowledge that the agent lowered or increased the interest rate for the customer's account. Moreover, the entity may not have authorized the agent to lower or increase the interest rate associated with the customer's account. As a further example, the service may be an instance where the agent unilaterally lowers or raises a credit maximum associated with the customer's account, where the account may or may not qualify for the lower or higher credit maximum. The customer may or may not have knowledge that the agent lowered or increased the credit maximum for the customer's account. Moreover, the entity may not have authorized the agent to unilaterally lower or increase the credit maximum associated with the customer's account. As a further example, the service may be the agent unilaterally transferring (e.g., wiring) funds into and/or out of the customer's account. This transferring of funds may be executed by the agent with or without the permission (and/or knowledge) of the customer and/or the entity. As a further example, the service may be the agent unilaterally ordering a checkbook associated with the customer's account. The ordering of a checkbook may be executed by the agent with or without the permission of the customer (and/or the permission of the entity). As a further example, the service may be ordering an extra credit card associated with the customer's account. The ordering of an extra credit card may be executed by the agent with or without permission of the customer (and/or the permission of the entity).

In some embodiments, the first information may include information regarding a plurality of actions performed over a predetermined period of time by the agent across one or more applications. For instance, the apparatus may include information obtained from an agent's action executed via a search application, where the search application enables the agent to search for accounts in a portion of a database with parameters defined by the agent (e.g., a minimum account balance, a location, an account that engages in three or more daily monetary transactions, and the like.) As a further instance, the apparatus may include information obtained from a viewer application, where the viewer application allows the agent to view information elements associated with accounts. In some embodiments, the viewer application also presents the accounts (e.g., accounts accessible to the agent) as search results in response to the agent's execution of a search query. For each account viewed by the agent, the first information may include each information element viewed by the agent. As a further instance, the apparatus may include information obtained from an editor application, where the editor application allows the agent to edit information elements associated with accounts accessible to the agent. For each account edited by the agent, the first information may include each information element edited by the agent. As a further instance, the apparatus may include information obtained from an agent's action executed via a 'funds transfer' application, where the funds transfer application enables the agent to transfer funds in and out of accounts accessible to the agent. As a further instance, the apparatus may include information obtained from an agent's action executed via a payment card ordering application, where the payment card ordering application enables the agent to order one or more credit cards (or other payment cards) for an account accessible by the agent.

As a further instance, the apparatus may include information obtained from the agent's workstation. This information may include actions performed by the agent. The actions performed by the agent may be associated with "personal" applications. For example, the apparatus may include information regarding any personal email accounts accessed by the agent. The apparatus may also include information regarding any account information copied to an external data system or transferred from a software application to an external data system (e.g., the agent's personal hard drive, the agent's personal email account, and the like.).

Regarding block 110, in some embodiments, the apparatus may receive the first information and determine whether it is an abnormal event associated with the received first information (i.e., associated with the agent's action or set of actions). If the apparatus recognizes an abnormal event associated with an agent's action, the apparatus may consider this abnormal event when computing the risk score associated with the agent's action (and/or notify appropriate personnel in the entity regarding the occurrence of an abnormal event). The apparatus may determine an abnormal event when the agent executes an action with respect to a customer (or a customer's account) that other comparable agents would not execute (e.g., other agents who have responsibilities similar to the agent). For example, the service may be an instance where the agent upgrades the status of (or provides a benefit to) the customer, where the customer does not qualify for the upgraded status (or the benefit). Moreover, the entity may not have authorized (or may have been duped into authorizing) the agent to upgrade the status of the customer. As a further example, the service may be an instance where the agent waives a fee for the customer, where the customer may not qualify for a fee waiver. Moreover, the entity may not have authorized (or may have been duped into authorizing) the agent to waive a fee for the customer. As a further example, the service may be an instance where the agent lowers an interest rate associated with the customer's account, where the account may not qualify for the lower interest rate. Moreover, the entity may not have authorized (or may have been duped into authorizing) the agent to lower an interest rate. As a further example, the service may be an instance where the agent raises a credit maximum associated with the customer's account, where the account may not qualify for the higher credit maximum. Moreover, the entity may not have authorized (or may have been duped into authorizing) the agent to raise a credit maximum. As a further example, the service may be wiring funds into a customer's account without the permission (and/or knowledge) of the customer. Moreover, the entity may not have authorized (or may have been duped into authorizing) the agent to wire funds into the customer's account.

As a further example, the apparatus may determine that the agent caused a detriment to the customer, where the customer did not qualify for the detriment at the time of causing the detriment. For example, the service may be an instance where the agent downgrades the status of a customer even though the customer still qualifies for a higher status. As a further example, the service may be an instance where the agent imposes a fee (e.g., fee for maintaining an investment account) for a customer even though the customer may qualify for a fee waiver. As a further example, the service may be an instance where the agent increases an interest rate associated with the customer's account, where the account may still qualify for the lower interest rate. As a further example, the service may be an instance where the agent lowers a credit maximum associated with the customer's account, where the account may still qualify for the higher credit maximum. As a further example, the service may be wiring funds out of a customer's account without the permission (and/or knowledge) of the customer.

Regarding block 120, the second information includes one or more entitlements granted to the agent by the entity. The second information may be captured in one or more datastores that allow for analytics and/or logic to be performed on the information for the purpose of leveraging the collected information to execute various routines/logic. An entitlement (or a privilege) may include permission granted to the agent to perform one or more actions. For instance, an entitlement may include the ability to read an information element (e.g., account number, social security number, payment card number, name, mailing address, email address, telephone number, and the like.) associated with a customer's account. As a further instance, an entitlement may include the ability to edit an information element associated with a customer's account. As a further instance, an entitlement may include the ability to transfer information from an agent's workstation to an external data system (e.g., the agent's personal email account, the agent's personal portable data storage system).

In some embodiments, each agent associated with the entity may be granted a separate set of entitlements. Therefore, while a first agent may have the ability to read a first set of information elements (e.g., name and mailing address) associated with an account, a second agent may have the ability to read a second set of information elements (e.g., name, mailing address, account number), and a third agent may have the ability to read a third set of information elements (e.g., name, mailing address, account number, and social security number). In some embodiment, the apparatus may dynamically modify, on a periodic basis, the entitlement set granted to an agent.

In some embodiments, while a first agent may have the ability to read an information element (e.g., name, telephone number, mailing address, email address, account number, payment card number social security number, and the like.) associated with an account, a second agent may have the ability edit an information element. In other embodiments, while a first agent may have the ability to read and/or edit an information element associated with an account, a second agent may have the ability read, edit and transfer to an external data system an information element associated with an account.

In some embodiments, each agent associated with the entity may be granted access to a different portions of the account database. A portion of access granted to a first agent may overlap with a portion of access granted to a second agent. Therefore, while a first agent may have the ability access accounts associated with account balances between $150,000 and $250,000, a second agent may have the ability to access associated with account balances between $200,000 and $300,000. As another instance, while a first agent may have the ability to access accounts associated with mailing addresses situated in Florida, a second agent may have the ability access accounts associated with mailing addresses situated in Florida, Georgia, Alabama, Tennessee, and North Carolina. As another instance, while a first agent may have the ability access accounts opened after Jan. 1, 2000, a second agent may have the ability to access accounts opened after Jan. 1, 1999. As another instance, while a first agent may have the ability access certain type of accounts (e.g., investment accounts), a second agent may have the ability to access a different type of accounts (e.g., deposit account). As used herein, the term "access" may refer to an agent's ability to read (and/or edit, and/or transfer to an external data system, and the like.) an information element associated with an account. The term "access" may also refer to an agent's ability search for a particular account. Therefore, if an agent defines and executes a search query, the apparatus presents a particular account among the search results if the particular account satisfies the search query and is part of the agent's accessible portion of the account database. In some embodiment, the apparatus may dynamically modify, on a periodic basis, the database portion to which the agent is granted access.

Regarding block 130, the apparatus may determine a risk score by executing a function that takes as input only the first information received at block 110, or only the second information received at block 120, or both the first information received at block 110 and the second information received at block 120. Embodiments of the risk score are defined in further detail with respect to FIG. 2.

In some embodiments, the apparatus may determine the first information indicates that the agent accessed an information element associated with an account. The apparatus may assign a score depending the agent's type of access. Types of access may include searching a database based on search parameters, reading information elements associated with an account, editing information elements associated with an account, transferring to an external data system information elements associated with an account, and the like. For example, the apparatus may assign a higher score to transferring an information element to an external data system compared to editing an information element. As a further example, the apparatus may assign a higher score to editing an information element compared to reading an information element. The score assigned to a type of access may be predetermined by the entity, or may be dynamically determined by the apparatus based on the agent who accessed the information element or based on the entitlements granted to the agent who accessed the information element. For instance, the apparatus may dynamically generate a higher risk score for an agent who read an account number for an account that resulted from executing a search query that used a particular minimum account balance as a search parameter if the agent previously read account numbers for an unusually high number of accounts that resulted from executing similar search queries. As a further instance, the apparatus may dynamically generate a higher risk score for an agent who transferred account information to an external data system if the agent previously transferred to an external data system account information associated with several accounts during a predetermined period in the past.

The apparatus may also assign a score depending on the type of information element accessed by the agent. For example, the apparatus may assign a higher score to accessing a social security number compared to accessing a mailing address associated with an account. As a further example, the apparatus may assign a higher score to accessing an account number compared to accessing an account balance. As a further example, the apparatus may assign a higher score to accessing an account balance compared to accessing a date of birth associated with a customer. The score assigned to a type of information element accessed by the agent may be predetermined by the entity, or may be dynamically determined by the apparatus based on the characteristics of the agent (e.g., length of agent's employment at the entity) who accessed the information element or based on the entitlements granted to the agent who accessed the information element. As a further instance of the apparatus' capability to dynamically determine a score associated with accessing an information element, the apparatus may dynamically generate a higher risk score for an agent who read a customer's name for an account if the agent previously read customer names for an unusually high number of accounts during a predetermined period in the past.

In some embodiments, in order to generate an action risk score for each action executed by an agent, the apparatus may subsequently or concurrently execute a score generating function. The score generating function may take as input the number and type of information elements that were accessed during the action, and the types of access associated with the action. For instance, if the apparatus determines that an agent executed a search for accounts with a minimum account balance of $300000 and a mailing address situated in a particular zip code, then the apparatus may assign a score for the search function and a score for each specific search parameter defined by the user. To obtain a total score associated with the agent's action, the apparatus may subsequently add the score for the search function with the score for each specific search parameter defined by the user. If the apparatus further determines the agent viewed the following information elements (account balance, name, mailing address, social security number) for the first ten search results (i.e., accounts), then, for each account viewed by the agent, the apparatus may assign a score for each information element viewed by the agent. The apparatus may subsequently add the scores for each account viewed by the agent to determine a total score associated with viewing the information elements for the ten accounts. The apparatus my subsequently add this score for viewing account information with the score for executing the search function to generate a total score for the actions (searching for accounts and viewing account information) performed by the agent.

In some embodiments, the apparatus may determine the first information indicates that the agent executed a search query to search for accounts that meet parameters defined in the search query. In some embodiments, the apparatus may assign a score based on the portion of the account database that the search query is defined to search. Additionally, in some embodiments, the apparatus may assign a score based on each parameter defined by the search query. For example, the apparatus may assign a higher score to selecting an account balance as a parameter compared to selecting a name associated with an account as a parameter. As a further example, the apparatus may assign a higher score to selecting a credit score as a parameter compared to selecting an account number as a parameter. As a further example, the apparatus may assign a higher score to selecting a mailing zip code as a parameter compared to selecting a first name as a parameter. The score assigned to a type of information element selected as a parameter by the agent may be predetermined by the entity, or may be dynamically determined by the apparatus based on the characteristics of the agent (e.g., length of service) who defined the search parameter(s) or based on the entitlements granted to the agent who defined the search parameter(s). For instance, the apparatus may dynamically generate a higher risk score for an agent who executed a search query using a zip code as a search parameter if the agent previously executed an unusually high number of similar search queries compared to a comparable agent.

In some embodiments, in order to generate an agent risk score for each agent, the apparatus may subsequently execute a score generating function using the scores associated with the agent's instances of access (e.g., search, read, edit, transfer, and the like.) over a predetermined period of time (e.g., during the past week or month). In some embodiments, for each agent, the apparatus may subsequently execute a score generating function using the scores associated with each information element accessed by an agent over a predetermined period of time (e.g., during the past week or month). In some embodiments, for each agent, the apparatus may subsequently execute a score generating function using both the first score associated with the agent's instances of access of accounts over a predetermined period of time (e.g., during the past week or month) and the second score associated with the agent's instances of access of accounts' information elements over the same predetermined period of time. In generating the total risk score associated with an agent's actions, the score generating function (e.g., an averaging function or some other function) may give equal or different weightage to both the first and second scores.

In some embodiments, the apparatus may compare the agent's total risk score to a predetermined threshold score. If the apparatus determines the agent's total risk score is greater than the predetermined threshold score, the apparatus may be configured to send an alert to appropriate personnel of the entity. In some embodiments, the apparatus may dynamically generate a threshold score based on the first information. For instance, if the apparatus determines that the first information indicates that the agent repeatedly executed similar search queries over a period of time or repeatedly accessed the same account over a period of time (or accessed, over a period of time, several accounts associated with addresses in the same zip code, or accessed, over a period of time, social security numbers associated with several accounts, and the like.), the apparatus may dynamically lower the threshold score associated with the agent. As a further instance, if the apparatus determines that the first information indicates that the agent repeatedly accessed the agent's personal email during a period of time, or repeatedly burned data on removable media at the agent's workstation, the apparatus may dynamically lower the threshold score associated with the agent. As a further instance, if the apparatus determines the first information indicates that the agent engaged in one or more actions unrelated to the agent's work responsibilities (e.g., the agent accessed, over a period of time, credit scores associated with several accounts, even though the agent does not work in the entity's division associated with marketing credit card offers to current or potential customers), then the apparatus may dynamically lower the threshold score associated with the agent.

In some embodiments, the apparatus may compare the agent's first risk score (i.e., the risk score associated with an agent's actions with one or more applications over a predetermined period of time) with the first risk score associated with other agents of the entity. In some embodiments, if the apparatus determines the agent's first risk score is abnormally higher (or a predetermined percentage amount higher) than the first risk score associated with other comparable agents of the entity, the apparatus may send an alert to appropriate personnel of the entity. In some embodiments, if the apparatus determines the agent's first risk score is a predetermined percentage amount higher than an average first risk score associated with a set of agents of the entity, the apparatus may send an alert to appropriate personnel of the entity.

In some embodiments, the apparatus may compare the agent's total risk score with the total risk score associated with other agents of the entity. In some embodiments, if the apparatus determines the agent's total risk score is abnormally higher (or a predetermined percentage amount higher) than the total risk score associated with other comparable agents of the entity, the apparatus may send an alert to appropriate personnel of the entity. In some embodiments, if the apparatus determines the agent's total risk score is a predetermined percentage amount higher than an average total risk score associated with a set of agents of the entity, the apparatus may send an alert to appropriate personnel of the entity.

In some embodiments, for each agent, the apparatus may execute a pattern or trend generating function using the agent's actions (e.g., instances of access of customer accounts (and information elements associated with customer accounts) over a predetermined period of time). The pattern generating function compares the agent's cumulative or aggregate actions with predetermined risk patterns or trends to determine whether the agent's cumulative actions pose a risk to customers' accounts or to the entity. If the pattern generating function determines a match (to a predetermined degree of reliability) between the agent's cumulative actions and the predetermined risk patterns, the pattern generating function may send an alert to appropriate personnel of the entity.

Additionally, in some embodiments, the apparatus may determine an entitlement score associated with each entitlement granted to an agent by the entity. For example, the apparatus may assign a higher score to the entitlement of transferring an information element to an external data system compared to the entitlement of editing an information element. As a further example, the apparatus may assign a higher score to the entitlement of editing an information element compared to the entitlement of reading an information element. The score assigned to a type of entitlement may be predetermined by the entity, or may be dynamically determined by the apparatus based on the characteristics of the agent (e.g., length of employment with the entity) who accessed the information element. For instance, the apparatus may assign a lower risk score to a first agent's (employed at the entity for ten years) entitlement to edit a mailing address associated with an account compared to a second agent's (employed at the entity for five years) entitlement to edit a mailing address associated with the same account.

The apparatus may also assign a score depending on the agent's entitlement to access a particular type of information element associated with an account. For example, the apparatus may assign a higher score to the entitlement of accessing a social security number compared to the entitlement of accessing a mailing address associated with an account. As a further example, the apparatus may assign a higher score to the entitlement of accessing an account number compared to the entitlement of accessing an account balance. As a further example, the apparatus may assign a higher score to the entitlement of accessing an account balance compared to the entitlement of accessing a date of birth associated with a customer. The score assigned to the entitlement of a type of information element accessed by the agent may be predetermined by the entity, or may be dynamically determined by the apparatus based on the characteristics of the agent (e.g., length of employment) who accessed the information element. For instance, the apparatus may assign a lower risk score to a first agent's (employed at the entity for ten years) entitlement to read a social security number associated with an account compared to a second agent's (employed at the entity for five years) entitlement to read the social security number associated with the same account. As explained with respect to FIGS. 4 and 5, the apparatus may execute a score generating function that combines the score associated with an agent's actions and the score associated with the agent's entitlements.

Regarding block 130, or other any process block of FIGS. 1 and 2, it will be understood that, in some embodiments, the term "determine" is meant to have its one or more ordinary meanings (i.e., its ordinary dictionary definition(s)), but in other embodiments, that term is additionally or alternatively meant to include the one or more ordinary meanings of one or more of the following terms: conclude, decide, identify, ascertain, find, discover, learn, verify, calculate, observe, read, extract, and/or the like. Further, it will be understood that, in some embodiments, the phrase "based at least partially on" is meant to have its one or more ordinary meanings, but in other embodiments, that phrase is additionally or alternatively meant to include the one or more ordinary meanings of one or more of the following phrases: "in response to," "upon or after," "because of," "as a result of," "if," "when," and/or the like.

In some embodiments, the apparatus having the process flow 100 can be configured to perform any one or more portions of the process flow 100 represented by blocks 110-130 upon or after one or more triggering events, which, in some embodiments, is one or more of the other portions of the process flow 100. As used herein, it will be understood that a "triggering event" refers to an event that automatically triggers the execution, performance, and/or implementation of a triggered action, either immediately, nearly immediately (i.e., within seconds or minutes), or sometime after the occurrence of the triggering event. For example, in some embodiments, the apparatus is configured such that the apparatus first receives first information associated with an agent, where the agent executes one or more actions (over a predetermined period of time) with respect to a customer's account or information associated with a customer (e.g., information in a paper/electronic application submitted by the customer). In some embodiments, the apparatus is triggered to receive second information associated with entitlements granted to the agent once the apparatus receives first information associated with an agent's action. In some embodiments, the apparatus is triggered to receive second information associated with entitlements granted to the agent once the apparatus determines an abnormal event associated the agent's action.

In some embodiments, a predetermined time and/or the passage of a predetermined period of time may serve to trigger one or more of the portions represented by blocks 110-130. Also, in some embodiments, the apparatus is configured to automatically perform one or more (or all) of the portions of the process flow 100 represented by blocks 110-130. In other embodiments, one or more (or all) of the portions of the process flow 100 represented by blocks 110-130 require and/or involve at least some human intervention. In addition to the process flow 100, any of the embodiments described and/or contemplated herein can involve one or more triggering events, triggered actions, automatic actions, apparatus actions, and/or human actions.

It will also be understood that the apparatus having the process flow 100 may be configured to perform any one or more portions of any embodiment described and/or contemplated herein, including, for example, any one or more portions of the process flow 200 described later herein. In addition, the number, order, and/or content of the portions of the process flow 100 are exemplary and may vary. Indeed, the process flow 100, like all of the other process flows described herein, can include one or more additional and/or alternative process flow portions, and the apparatus configured to perform the process flow 100 can be configured to perform one or more additional and/or alternative functions.

Referring now to FIG. 2, a flowchart 200 is provided for determining a risk score, in accordance with some embodiments of the invention. In some embodiments, the process flow 200 is performed by an apparatus having hardware and/or software configured to perform one or more portions of the process flow 100.

At block 130, the apparatus may determine a risk score by executing a function that takes as input only the first information received at block 110, or only the second information received at block 120, or both the first information received at block 110 and the second information received at block 120. Block 130 has been described in detail with respect to FIG. 1.

Subsequently, at block 220, the apparatus may determine whether the determined risk score is greater than a predetermined threshold score. If the apparatus determines that the risk score is greater than a predetermined threshold score, then, as represented at block 224, the apparatus may be configured to generate an alert (and/or send a report to) one or more personnel associated with the entity. If the apparatus determines that the risk score is not greater than a predetermined threshold score, then, as represented at block 222, the apparatus may not be configured to generate an alert (and/or send a report to) one or more personnel associated with the entity. In some embodiments, the apparatus is automatically configured to generate an alert (and/or send a report to) one or more personnel associated with the entity regardless of whether the determined risk score is greater than a predetermined threshold score. In some embodiments, the apparatus is configured to generate a periodic (e.g., daily, weekly, monthly, and the like.) report that includes a list of agents and is arranged in descending order according to the risk score associated with each agent.

In some embodiments, the threshold score varies from one agent to another agent, and is dynamically determined by the apparatus. In some embodiments, the apparatus may dynamically determine a threshold score based at least partially on attributes or characteristics associated with the agent. In some embodiments, the apparatus may dynamically set a lower threshold if the apparatus determines that the agent has recently interacted with the same customer's account. In some embodiments, the apparatus may dynamically set a lower CCW threshold if the apparatus determines that the agent interacted with the same customer (or the same customer's account) at least a predetermined number of times (e.g., ten times) within a predetermined period in the past (e.g., previous three months). In some embodiments, the apparatus may dynamically set a lower threshold if the apparatus determines that the agent's interactions with the same customer (or the same customer's account) are unusually or abnormally greater than a comparable's agent's interactions with a customer (or a customer's account) over a predetermined period (e.g., previous three months). An unusual number of interactions over a predetermined period may indicate that the agent is engaging in activity that provides a benefit to or causes a detriment to the customer, and consequently may be classified as risky behavior. In other embodiments, an unusual or abnormal number of interactions over a predetermined period may indicate that the agent is testing the limits of an entity's risk detection application. In other embodiments, an unusual number of interactions over a predetermined period may indicate that the agent is in need of remedial training so that the agent can understand the dangers of accessing the same customer's account on multiple occasions within a short period of time.

The process moves to block 112 of FIG. 1 where the user may select a payment vehicle. For instance, in one embodiment, the user may select Payment Card A as the payment vehicle. In one embodiment, a user may also select a gift card as the payment vehicle. In another embodiment, the user may select multiple payment vehicles and the percentage amount of the payment amount or an absolute amount to be paid from each payment vehicle.

In some embodiments, the apparatus having the process flow 200 may be configured to perform any one or more portions of the process flow 200 represented by blocks 130-224 upon or after one or more triggering events, which, in some embodiments, is one or more of the other portions of the process flow 200. As used herein, it will be understood that a "triggering event" refers to an event that automatically triggers the execution, performance, and/or implementation of a triggered action, either immediately, nearly immediately (i.e., within minutes), or sometime after the occurrence of the triggering event.

In some embodiments, a predetermined time and/or the passage of a predetermined period of time may serve to trigger one or more of the portions represented by blocks 130-224. Also, in some embodiments, the apparatus (e.g., the management system 330) may be configured to automatically perform one or more (or all) of the portions of the process flow 200 represented by blocks 130-224. In other embodiments, one or more (or all) of the portions of the process flow 200 represented by blocks 130-224 require and/or involve at least some human intervention. In addition to the process flow 200, any of the embodiments described and/or contemplated herein can involve one or more triggering events, triggered actions, automatic actions, apparatus actions, and/or human actions. In addition, the number, order, and/or content of the portions of the process flow 200 are exemplary and may vary. Indeed, the process flow 200, like all of the other process flows described herein, can include one or more additional and/or alternative process flow portions, and the apparatus configured to perform the process flow 200 can be configured to perform one or more additional and/or alternative functions.

Referring now to FIG. 3, a system 300 is presented for determining a risk score, in accordance with an embodiment of the present invention. As illustrated, the system 300 includes a network 310, a management system 330, and an agent interface system 340. FIG. 3 also illustrates an account 331 (e.g., the customer's account), which is operatively connected (e.g., linked) to the management system 330. In this embodiment, the management system 330, along with the account 331 and the agent interface system 340 are maintained by an entity.

As shown in FIG. 3, the management system 330, and the agent interface system 340 are each operatively and selectively connected to the network 310, which may include one or more separate networks. In addition, the network 310 may include a local area network (LAN), a wide area network (WAN), and/or a global area network (GAN), such as the Internet. It will also be understood that the network 310 may be secure and/or unsecure and may also include wireless and/or wireline and/or optical interconnection technology.

The agent interface system 340 may include any computerized apparatus that can be configured to perform any one or more of the functions of the agent interface system 340 described and/or contemplated herein. In some embodiments, for example, the agent interface system 340 may include a personal computer system, a mobile computing device, a personal digital assistant, a public kiosk, a network device, and/or the like. As illustrated in FIG. 3, in accordance with some embodiments of the present invention, the agent interface system 340 includes a communication interface 342, a processor 344, a memory 346 having an account application 347 stored therein, and a user interface 349. In such embodiments, the communication interface 342 is operatively and selectively connected to the processor 344, which is operatively and selectively connected to the user interface 349 and the memory 346.

Each communication interface described herein, including the communication interface 342, generally includes hardware, and, in some instances, software, that enables a portion of the system 300, such as the agent interface system 340, to transport, send, receive, and/or otherwise communicate information to and/or from the communication interface of one or more other portions of the system 300. For example, the communication interface 342 of the agent interface system 340 may include a modem, server, electrical connection, and/or other electronic device that operatively connects the agent interface system 340 to another electronic device, such as the electronic devices that make up the management system 330.

Each processor described herein, including the processor 344, generally includes circuitry for implementing the audio, visual, and/or logic functions of that portion of the system 300. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the account application 347 of the memory 346 of the agent interface system 340.

Each memory device described herein, including the memory 346 for storing the account application 347 and other data, may include any computer-readable medium. For example, memory may include volatile memory, such as volatile random access memory (RAM) having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 3, the memory 346 includes the account application 347. In some embodiments, the account application 347 includes an interface for communicating with, navigating, controlling, configuring, and/or using the management system 330 and/or other portions of the system 300. For example, in some embodiments, the agent 345 may use the account application 347 to view (or edit, transmit to an external data system, and the like.) information associated with account 331. The agent may also use the same account application 347 or a different account application in order to search for accounts that are accounts that are accessible to the agent. The agent 345 may also use the account application 347 to provide one or more services to the customer or the customer's account 331. In some embodiments, the account application 347 includes computer-executable program code portions for instructing the processor 344 to perform one or more of the functions of the account application 347 described and/or contemplated herein. In some embodiments, the account application 347 may include and/or use one or more network and/or system communication protocols.

Also shown in FIG. 3 is the user interface 349. In some embodiments, the user interface 349 includes one or more user output devices, such as a display and/or speaker, for presenting information to the agent 345 and/or some other user. In some embodiments, the user interface 349 includes one or more user input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the agent 345 and/or some other user. In some embodiments, the user interface 349 includes the input and display devices of a personal computer, such as a keyboard and monitor, that are operable to receive and display information associated with the account.

FIG. 3 also illustrates a management system 330, in accordance with an embodiment of the present invention. The management system 330 may include any computerized apparatus that can be configured to perform any one or more of the functions of the management system 330 described and/or contemplated herein. In accordance with some embodiments, for example, the management system 330 may include a computer network, an engine, a platform, a server, a database system, a front end system, a back end system, a personal computer system, and/or the like. In some embodiments, such as the one illustrated in FIG. 3, the management system 330 includes a communication interface 332, a processor 334, and a memory 336, which includes an risk score application 337 and an datastore 338 stored therein. As shown, the communication interface 332 is operatively and selectively connected to the processor 334, which is operatively and selectively connected to the memory 336.

It will be understood that the risk score application 337 may be configured to implement any one or more portions of any one or more of the process flows 100 and/or 200 described and/or contemplated herein. It will also be understood that, in some embodiments, the risk score application 337 is configured to communicate with the datastore 338, and/or any one or more other portions of the system 300. As an example, in some embodiments, the risk score application 337 is configured to receive first information associated with an agent, where the agent associated with an entity executed one or more actions associated with one or more applications over a predetermined period of time. As a further example, the risk score application 337 is further configured to receive, from a data system (e.g., datastore) second information associated with the agent, where the second information includes one or more entitlements granted to the agent by the entity. As a further example, the risk score application 337 is further configured to determine a risk score based solely on the first information, or based solely on the second information, or based at least partially on both the first information and the second information. As a further example, the risk score application 337 is further configured to recognize that an action includes the agent initiating execution of a search query based on one or more parameters, where execution of the search query produces a list of accounts that satisfy the one or more parameters. As a further example, the risk score application 337 is further configured to recognize that an action includes an agent accessing (e.g., reading, editing, transferring to an external data system, etc.) one or more information elements associated with an account. As a further example, the risk score application 337 is further configured to recognize that an action includes, for example, an agent changing a status associated with a customer, or an agent providing a reward to a customer, or an agent waiving or imposing a fee for a customer, or an agent lowering or raising an interest rate associated with the customer's account, or an agent raising or lowering a credit maximum associated with the customer's account, or an agent transferring funds into or out of an account, or an agent ordering a new checkbook or new credit cards, etc. As a further example, the risk score application 337 is further configured to recognize that an entitlement includes permission to access a portion of a database that includes information elements associated with accounts. As a further example, the risk score application 337 is further configured to recognize that an entitlement includes permission granted to the agent by the entity to access an information element (e.g., reading, editing, transferring to an external data system, etc.) associated with an account.

As a further example, the risk score application 337 is further configured to determine an information element score associated with each information element accessed by the agent, where the action includes the agent accessing one or more information elements associated with an account, and is further configured to execute a first score generating function using the determined information element scores. As a further example, the risk score application 337 is further configured to determine a parameter score associated with each parameter defined by the agent, where the action includes the agent initiating execution of a search query based on one or more search parameters, and is further configured to execute a second score generating function using the determined parameter scores. As a further example, the risk score application 337 is further configured to determine an entitlement score associated with each entitlement associated with the agent, and is further configured to execute a score generating function using the determined entitlement scores. As a further example, the risk score application 337 is further configured to initiate an alert in response to determining the second risk score is greater than a threshold score, where the threshold score is dynamically determined by the risk score application 337 based at least partially on the first information.

In some embodiments, the risk score application 337 is configured to generate a periodic (e.g., daily, weekly, monthly, and the like.) report that includes a list of agents that is arranged in descending order according to the risk score associated with each agent. The risk score application 337 may send this report via a communication mechanism (e.g., via email) to one or more personnel associated with the entity. This report may include a link to the risk score associated with each agent. When the personnel selects the link, the risk score application 337 initiates presentation of a screenshot similar to that presented in FIG. 4 or FIG. 5.

It will also be understood that, in some embodiments, the memory includes other applications. For example, an application may be configured to provide account management services to the customer at the customer's interface system such as, for example, any of the account management services described and/or contemplated herein. As another example, another application may be configured to allow the agent 345 to provide a service to the customer 315. In some embodiments, the service may be associated with the customer's account 331.

It will be further understood that, in some embodiments, the risk score application 337 includes computer-executable program code portions for instructing the processor 334 to perform any one or more of the functions of the risk score application 337 described and/or contemplated herein. In some embodiments, the risk score application 337 may include and/or use one or more network and/or system communication protocols.

In addition to the risk score application 337, the memory 336 also includes the datastore 338. As used herein, the datastore 338 may be one or more distinct and/or remote datastores. In some embodiments, the datastore 338 is not located within the management system and is instead located remotely from the management system. In some embodiments, the datastore 338 stores information (e.g., second information-block 120 of FIG. 1) regarding entitlements granted to one or more agents associated with the entity. In some embodiments, the datastore 338 stores information (e.g., first information-block 110 of FIG. 1) regarding one or more actions executed by one or more agents associated with the entity.

Subsequently, in one embodiment, the payment terminal may identify the payment vehicle data packet by identifying the protocol associated with the payment vehicle data packet. For instance, if the received payment vehicle data packet protocol is identified as a first type of protocol, the received payment vehicle data is Payment Card A payment vehicle data. If the received payment vehicle data packet protocol is identified as a second type of protocol, the received payment vehicle data is Payment Card B payment vehicle data. If the received payment vehicle data packet protocol is identified as a third type of protocol, the received payment vehicle data is Payment Card C payment vehicle data. If the received payment vehicle data packet protocol is identified as a fourth type of protocol, the received payment vehicle data may be gift card data.

It will be understood that the embodiment illustrated in FIG. 3 is exemplary and that other embodiments may vary. As another example, in some embodiments, the management system 330 includes more, less, or different components, such as, for example, an account manager user interface. As another example, in some embodiments, some or all of the portions of the system 300 may be combined into a single portion. Specifically, in some embodiments, the agent interface system 340 and the management system 330 are combined into a single agent interface and management system configured to perform all of the same functions of those separate portions as described and/or contemplated herein. Likewise, in some embodiments, some or all of the portions of the system 300 may be separated into two or more distinct portions.

In addition, the various portions of the system 300 may be maintained for by the same or separate parties. For example, as previously mentioned, a single financial institution may maintain the account 331 and the management system 330. However, in other embodiments, the account 331 and the management system 330 may each be maintained by separate entities.

It will also be understood that the system 300 may include and/or implement any embodiment of the present invention described and/or contemplated herein. For example, in some embodiments, the system 300 is configured to implement any one or more of the embodiments of the process flow 100 described and/or contemplated herein in connection with FIG. 1, any one or more of the embodiments of the process flow 200 described and/or contemplated herein in connection with FIG. 2, and/or any one or more of the embodiments of the system 300 described and/or contemplated herein in connection with FIG. 3.

FIGS. 4 and 5 illustrate example screenshots of risk score determinations produced by an apparatus based on an agent's actions with respect to a customer's account (and/or other information provided by a customer). The screenshots discussed below with respect to various process blocks are mere examples of screenshots in some embodiments of the invention. In other embodiments of the invention, the screenshots may include additional features not described herein, or may not include each and every feature described herein. As used with respect to the various screenshots of FIGS. 4 and 5, an "apparatus" may be the management system 330 depicted in FIG. 3. The apparatus may generate, or initiate generation of, the screenshots presented in FIGS. 4 and 5 and may cause the presentation of one or more elements in each screenshot presented in FIGS. 4 and 5.

FIG. 4 presents an example screenshot of a page 400 that is presented to personnel associated with the entity when the personnel selects a link (e.g., in a report) to a risk score associated with a particular agent. In some embodiments, the apparatus may not automatically present details about the agent's risk score. Therefore, in some embodiments, in order to view the page 400, the personnel may need to authenticate himself/herself to the risk score application.

FIG. 4 presents the type of actions 412 associated with the agent (where the actions may have been executed within a predetermined time period, e.g., the previous week) and the type of entitlements 414 granted to the agent by the entity. As presented in FIG. 4, the agent executed a search query and accessed account information associated with an account. Regarding the agent's execution of a search query, the apparatus presents a selectable option 452 (e.g., digital button, menu, or the like) that allows personnel associated with the entity to learn more about the execution of the search query. When the personnel selects the option 452, the apparatus presents to the personnel via a pop-up window 474 (or by redirecting the personnel to a new interface page), that the agent searched a particular database (databases name: AB) and defined an account balance, a credit score, and an age as search parameters. The apparatus also presents to the user that the risk score associated with searching the database AB is 95 (out of 100), the risk score associated with defining an account balance as a search parameter is 93 (out of 100), the risk score associated with defining a credit history as a search parameter is 85 (out of 100), and the risk score associated with defining an age as a search parameter is 45 (out of 100). In some embodiments, the risk score associated with searching a larger account database may be higher than the risk score with searching a smaller account database. In some embodiments, the risk score associated with defining a high minimum account balance as a search parameter may also be higher than the risk score associated with defining a lower minimum account balance as a search parameter. Similarly, the risk score associated with defining a high credit score as a search parameter may also be higher than the risk score associated with defining a lower credit score as a search parameter. In some embodiments, the risk score associated with defining an earlier date of birth (i.e., account associated with an older customer) may be higher than the risk score associated with defining a later date of birth as a search parameter.

Regarding the agent's access of account information, the apparatus presents a selectable option 454 (e.g., digital button, menu, or the like) that allows personnel associated with the entity to learn more about the access of account information. When the personnel selects the option 454, the apparatus presents to the personnel in a pop-up window 478 (or by redirecting the personnel to a new interface page) that the agent accessed a particular account number and read the account number, the social security number, the first name, the last name, the age, and the mailing address associated with the particular account number. The apparatus also presents to the personnel that the risk score associated with reading the account number is 95 (out of 100), the risk score associated with reading the social security number is 100 (out of 100), the risk score associated with reading the first name is 18 (out of 100), the risk score associated with reading the last name is 45 (out of 100), the risk score associated with reading the age (or date of birth) is 43 (out of 100), and the risk score associated with reading the mailing address is 79 (out of 100). In some embodiments, the risk score associated with reading these information elements may be higher if the account balance associated with the account is higher. In other embodiments, the risk score associated with reading these information elements may be higher if the account qualifies for a higher status that merits stronger protection against information theft. In some embodiments, the risk score associated with editing (or transferring to an external data system) information elements associated with an account may be higher than the risk score associated with merely reading information elements associated with an account. The apparatus also presents to the personnel that the total score 484 associated with both the execution of the search query and the access of the account information is 76 (out of 100).

FIG. 4 also presents the entitlements 414 granted to the agent. For instance, the apparatus presents to the personnel that the agent has been granted access to the account database. Regarding the agent's access to the account database, the apparatus presents a selectable option 456 (e.g., digital button, menu, or the like) that allows personnel associated with the entity to learn more about the agent's access to the account database. When the personnel selects the option 456, the apparatus presents to the personnel in a pop-up window 492 (or by redirecting the personnel to a new interface page) that the agent has access to a particular percentage (89.33%) of accounts maintained by the entity. The apparatus also presents the names of the account databases (AB, B2C, D353, 75C, 98D) that are accessible to the agent. The apparatus also presents to the personnel that the agent is entitled to read information associated with accounts accessible to the agent, the agent is entitled to edit information associated with those accounts, and the agent is entitled to transfer information associated with those accounts to an external data system.

Regarding the agent's entitlement to read information associated with accounts accessible to the agent, the apparatus presents a selectable option 458 (e.g., digital button, menu, or the like) that allows personnel associated with the entity to learn more about the agent's access to read the account information. For instance, when the personnel selects the option 458, the apparatus may present to the personnel in a pop-up window 494 (or by redirecting the personnel to a new interface page) that the agent is entitled to read only certain information elements (e.g., name, contact information, and account balance, but not social security number and account number) associated with accounts accessible to the agent. Regarding the agent's entitlement to edit information associated with accounts accessible to the agent, the apparatus presents a selectable option 460 (e.g., digital button, menu, or the like) that allows personnel associated with the entity to learn more about the agent's access to edit the account information. For instance, when the personnel selects the option 460, the apparatus may present to the personnel in a pop-up window 496 (or by redirecting the personnel to a new interface page) that the agent is entitled to edit only certain information elements (e.g., contact information (mailing address) but not name, social security number and account number) associated with accounts accessible to the agent. Regarding the agent's entitlement to transfer to an external data system information associated with accounts accessible to the agent, the apparatus presents a selectable option 462 (e.g., digital button, menu, or the like) that allows personnel associated with the entity to learn more about the agent's access to transfer information to an external data system (e.g., the agent has Compact Disc (CD) burning capability, the agent has USB drive functionality, the agent is permitted access to personal email/chat, and the like.). For instance, when the personnel selects the option 462, the apparatus may present to the personnel in a pop-up window 498 (or by redirecting the personnel to a new interface page) that the agent is entitled to transfer data to the presented external data systems via the agent's workstation. The apparatus also presents to the personnel that the total score 488 associated with entitlements granted to the agent is 82 (out of 100).

FIG. 4 also presents the overall risk score 406 (8.95 out of 10) as determined by the apparatus at block 130 of FIG. 2. In order to generate the overall risk score 406, the apparatus may take as input for a score generating function, the first score 484 associated with the agent's actions and the second score 488 associated with entitlements granted to the agent by the entity. The apparatus may not give equal weightage the first 484 and second 488 scores when computing the total risk score. In some embodiments, the overall risk score generating function may be dynamically generated based on the agent's actions and/or the agent's entitlements. For instance, the apparatus may dynamically generate an overall risk score generating function that gives greater weightage to the agent's actions rather than to the agent's entitlements if the agent executed several high risk scoring search queries during a predetermined period in the past when compared to a comparable agent's execution of search queries during the same predetermined period in the past. As a further instance, the apparatus may dynamically generate an overall risk score generating function that gives greater weightage to the agent's actions rather than to the agent's entitlements if the agent accessed several accounts' high risk scoring information elements during a predetermined period in the past when compared to a comparable agent's access of accounts during the same predetermined period in the past.

FIG. 4 also presents a selectable link that allows the personnel to learn more about the determined overall risk score.

For instance, by selecting the 'Click to Learn More About Risk score' option, the personnel is directed to another page or a pop-up window that explains the factors that went into generating the risk score. For example, the apparatus may initiate a message explaining that the risk score is relatively high because the agent searched a large database and used search parameters associated with higher risk scores, and accessed information elements that are also associated with higher risk scores. FIG. 4 also presents the risk color 404 associated with the risk score 406. As explained earlier, for example, a risk score of 0 may be associated with a white color graph, and risk score of 10 may be associated with a black color graph. Therefore, since the determined risk score is 8.95, the risk color graph is a darker shade of grey rather than a lighter shade of grey.

FIG. 5 presents another example screenshot of a page 500 that is presented to personnel associated with the entity when the personnel selects a link (e.g., in a report) to a risk score associated with a particular agent. When the personnel selects the option 452, the apparatus presents to the personnel via a pop-up window 474 (or by redirecting the personnel to a new interface page), that the agent searched a particular database (databases name: B2C) and defined an address as the search parameter. When the personnel selects the option 454, the apparatus presents to the personnel via a pop-up window 478 (or by redirecting the personnel to a new interface page), that the agent accessed a particular account number and read the address associated with the particular account number. The apparatus also presents to the user that the risk score associated with searching the database B2C is 55 (out of 100) and the risk score associated with defining a mailing address as a search parameter is 32 (out of 100). The apparatus also presents to the personnel that the risk score associated with reading the address of the particular account number is 56 (out of 100).

The total risk score 406 and the first risk score 484 that are determined by the apparatus in FIG. 5 are different from the total risk score and the first risk score, respectively, that are determined by the apparatus in FIG. 4. This may be because the apparatus determined that the agent's actions listed in FIG. 5 were less risky than the agent's actions listed in FIG. 4. For instance, as presented in FIG. 5, the agent searched a smaller database (database B2C may be smaller than database AB) and used a single search parameter (e.g., mailing address) that is associated with a lower risk score, and accessed information elements (e.g., mailing address) that are also associated with lower risk scores. FIG. 5 also presents the risk color 404 associated with the risk score 406. As explained earlier, for example, a risk score of 0 is associated with a white color graph, and risk score of 10 is associated with a black color graph. Therefore, since the determined risk score is 6.95, the risk color graph is a lighter shade of grey rather than a darker shade of grey.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, and the like.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, and the like.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for determining a risk score, the method comprising:

receiving, at a computing device, first information associated with an agent executing an action via an application, wherein the action comprises the agent accessing, via the application, one or more information elements associated with an account, wherein the agent is associated with an entity that manages the account, wherein the agent does not own the account;

receiving, from a data system, second information associated with the agent, wherein the second information comprises one or more entitlements granted to the agent by the entity; and determining, via a computing device processor, a first risk score based at least partially on the first information and the second information, wherein the first risk score is higher if the agent was not entitled to execute the action and the first risk score is lower if the agent was entitled to execute the action, wherein the first risk score is higher if the agent edited an information element associated with the account and the first risk score is lower if the agent read an information element associated with the account.

2. The method of claim 1, further comprising:

determining an agent risk score based at least partially on the first information, wherein the first information further comprises one or more of the agent's actions over a predetermined period of time related to one or more applications.

3. The method of claim 2, further comprising:

determining a second risk score based at least partially on the second information.

4. The method of claim 1, wherein an information element includes account information associated with the account.

5. The method of claim 4, wherein the account information includes at least one of an account number, an account balance, and a payment card number.

6. The method of claim 1, wherein an information element includes personal information associated with a customer.

7. The method of claim 6, wherein the personal information includes at least one of a name, a date of birth, contact information, a social security number, and a credit score.

8. The method of claim 1, wherein accessing an information element associated with an account comprises reading the information element.

9. The method of claim 1, wherein accessing an information element associated with an account comprises editing the information element.

10. The method of claim 1, wherein accessing an information element associated with an account comprises transferring the information element to an external system.

11. The method of claim 1, wherein the action comprises at least one of the agent changing a status associated with a customer, waiving a fee for the customer, lowering an interest rate associated with the customer's account, and raising a credit maximum associated with the customer's account.

12. The method of claim 1, wherein an entitlement comprises permission to access a portion of a database that comprises information elements associated with accounts.

13. The method of claim 12, wherein an entitlement further comprises permission to read an information element associated with an account.

14. The method of claim 12, wherein an entitlement further comprises permission to edit an information element associated with an account.

15. The method of claim 12, wherein an entitlement further comprises permission to transfer an information element associated with an account to an external system.

16. The method of claim 1, wherein determining a first risk score further comprises:

determining an information element score associated with each information element accessed by the agent, wherein the action comprises the agent accessing one or more information elements associated with the account; and executing a first score generating function using the determined information element scores.

17. The method of claim 1, wherein the action further comprises the agent initiating execution of a search query based on one or more parameters, wherein execution of the search query produces a list of accounts that satisfy the one or more parameters.

18. The method of claim 17, wherein determining a first risk score further comprises:
   determining a parameter score associated with each parameter defined by the agent, wherein the action comprises the agent initiating execution of a search query based on one or more parameters; and
   executing a second score generating function using the determined parameter scores.

19. The method of claim 3, wherein determining a second risk score further comprises:
   determining an entitlement score associated with each entitlement associated with the agent; and
   executing a third score generating function using the determined entitlement scores.

20. The method of claim 3, further comprising:
   initiating an alert in response to determining the second risk score is greater than a threshold score, wherein the threshold score is either dynamically determined based at least partially on the first information, or is an average score associated with a set of agents.

21. An apparatus for determining a risk score, the method comprising:
   a memory;
   a processor; and
   a module stored in the memory, executable by the processor, and configured to:
   receive, at a computing device, first information associated with an agent executing an action via an application, wherein the action comprises the agent accessing, via the application, one or more information elements associated with an account, wherein the agent is associated with an entity that manages the account, wherein the agent does not own the account;
   receive, from a data system, second information associated with the agent, wherein the second information comprises one or more entitlements granted to the agent by the entity; and
   determine a first risk score based at least partially on the first information and the second information,
   wherein the first risk score is higher if the agent was not entitled to execute the action and the first risk score is lower if the agent was entitled to execute the action,
   wherein the first risk score is higher if the agent edited an information element associated with the account and the first risk score is lower if the agent read an information element associated with the account.

22. The apparatus of claim 21, wherein the module is further configured to:
   determine an agent risk score based at least partially on the first information,
   wherein the first information further comprises one or more of the agent's actions over a predetermined period of time related to one or more applications.

23. The apparatus of claim 22, wherein the module is further configured to:
   determine a second risk score based at least partially on the second information.

24. The apparatus of claim 21, wherein an information element includes account information associated with the account.

25. The apparatus of claim 24, wherein the account information includes at least one of an account number, an account balance, and a payment card number.

26. The apparatus of claim 21, wherein an information element includes personal information associated with a customer.

27. The apparatus of claim 26, wherein the personal information includes at least one of a name, a date of birth, contact information, a social security number, and a credit score.

28. The apparatus of claim 21, wherein the agent accessing an information element associated with an account comprises reading the information element.

29. The apparatus of claim 21, wherein the agent accessing an information element associated with an account comprises editing the information element.

30. The apparatus of claim 21, wherein the agent accessing an information element associated with an account comprises transferring the information element to an external system.

31. The apparatus of claim 21, wherein the action comprises at least one of the agent changing a status associated with a customer, waiving a fee for the customer, lowering an interest rate associated with the customer's account, and raising a credit maximum associated with the customer's account.

32. The apparatus of claim 21, wherein an entitlement comprises permission to access a portion of a database that comprises information elements associated with accounts.

33. The apparatus of claim 32, wherein an entitlement further comprises permission to read an information element associated with an account.

34. The apparatus of claim 32, wherein an entitlement further comprises permission to edit an information element associated with an account.

35. The apparatus of claim 32, wherein an entitlement further comprises permission to transfer an information element associated with an account to an external system.

36. The apparatus of claim 21, wherein to determine a first risk score, the module is further configured to:
   determine an information element score associated with each information element accessed by the agent, wherein the action comprises the agent accessing one or more information elements associated with the account; and
   execute a first score generating function using the determined information element scores.

37. The apparatus of claim 21, wherein the action further comprises the agent initiating execution of a search query based on one or more parameters, wherein execution of the search query produces a list of accounts that satisfy the one or more parameters.

38. The apparatus of claim 37, wherein to determine a first risk score, the module is further configured to:
   determine a parameter score associated with each parameter defined by the agent, wherein the action comprises the agent initiating execution of a search query based on one or more parameters; and
   execute a second score generating function using the determined parameter scores.

39. The apparatus of claim 23, wherein to determine a second risk score, the module is further configured to:
   determine an entitlement score associated with each entitlement associated with the agent; and
   execute a third score generating function using the determined entitlement scores.

40. The apparatus of claim 23, wherein the module is further configured to:

initiate an alert in response to determining the second risk score is greater than a threshold score, wherein the threshold score is either dynamically determined based at least partially on the first information, or is an average score associated with a set of agents.

41. A computer program product for determining a risk score, the method comprising:
a non-transitory computer-readable medium comprising a set of codes for causing a computer to:
receive, at a computing device, first information associated with an agent executing an action via an application, wherein the action comprises the agent accessing, via the application, one or more information elements associated with an account, wherein the agent is associated with an entity that manages the account, wherein the agent does not own the account;
receive, from a data system, second information associated with the agent, wherein the second information comprises one or more entitlements granted to the agent by the entity; and
determine a first risk score based at least partially on the first information and the second information,
wherein the first risk score is higher if the agent was not entitled to execute the action and the first risk score is lower if the agent was entitled to execute the action,
wherein the first risk score is higher if the agent edited an information element associated with the account and the first risk score is lower if the agent read an information element associated with the account.

42. The computer program product of claim 41, wherein the set of codes further causes a computer to: determine an agent risk score based at least partially on the first information, wherein the first information further comprises one or more of the agent's actions over a predetermined period of time related to one or more applications.

43. The computer program product of claim 42, wherein the set of codes further causes a computer to:
determine a second risk score based at least partially on the second information.

44. The computer program product of claim 41, wherein an information element includes account information associated with the account.

45. The computer program product of claim 44, wherein the account information includes at least one of an account number, an account balance, and a payment card number.

46. The computer program product of claim 41, wherein an information element includes personal information associated with a customer.

47. The computer program product of claim 46, wherein the personal information includes at least one of a name, a date of birth, contact information, a social security number, and a credit score.

48. The computer program product of claim 41, wherein the agent accessing an information element associated with an account comprises reading the information element.

49. The computer program product of claim 41, wherein the agent accessing an information element associated with an account comprises editing the information element.

50. The computer program product of claim 41, wherein the agent accessing an information element associated with an account comprises transferring the information element to an external system.

51. The computer program product of claim 41, wherein the action comprises at least one of the agent changing a status associated with a customer, waiving a fee for the customer, lowering an interest rate associated with the customer's account, and raising a credit maximum associated with the customer's account.

52. The computer program product of claim 41, wherein an entitlement comprises permission to access a portion of a database that comprises information elements associated with accounts.

53. The computer program product of claim 52, wherein an entitlement further comprises permission to read an information element associated with an account.

54. The computer program product of claim 52, wherein an entitlement further comprises permission to edit an information element associated with an account.

55. The computer program product of claim 52, wherein an entitlement further comprises permission to transfer an information element associated with an account to an external system.

56. The computer program product of claim 41, wherein to determine a first risk score, the set of codes further causes a computer to:
determine an information element score associated with each information element accessed by the agent, wherein the action comprises the agent accessing one or more information elements associated with the account; and
execute a first score generating function using the determined information element scores.

57. The computer program product of claim 41, wherein the action further comprises the agent initiating execution of a search query based on one or more parameters, wherein execution of the search query produces a list of accounts that satisfy the one or more parameters.

58. The computer program product of claim 57, wherein to determine a first risk score, the set of codes further causes a computer to:
determine a parameter score associated with each parameter defined by the agent, wherein the action comprises the agent initiating execution of a search query based on one or more parameters; and
execute a second score generating function using the determined parameter scores.

59. The computer program product of claim 43, wherein to determine a second risk score, the set of codes further causes a computer to:
determine an entitlement score associated with each entitlement associated with the agent; and
execute a third score generating function using the determined entitlement scores.

60. The computer program product of claim 43, wherein the set of codes further causes a computer to:
initiate an alert in response to determining the second risk score is greater than a threshold score, wherein the threshold score is either dynamically determined based at least partially on the first information, or is an average score associated with a set of agents.

* * * * *